(12) United States Patent
Yoshida

(10) Patent No.: US 9,969,458 B2
(45) Date of Patent: May 15, 2018

(54) AIR SUSPENSION

(71) Applicant: Showa Corporation, Gyoda-shi (JP)

(72) Inventor: Kojiro Yoshida, Fukuroi (JP)

(73) Assignee: SHOWA CORPORATION, Gyoda-Shi ( * ) Notice: Subject to any disclaimer, the term of this patent is extended or adjusted under 35 U.S.C. 154(b) by 27 days.

(21) Appl. No.: 15/005,883

(22) Filed: Jan. 25, 2016

(65) Prior Publication Data

US 2016/0280316 A1 Sep. 29, 2016

(30) Foreign Application Priority Data

Mar. 26, 2015 (JP) .................................. 2015-065183

(51) Int. Cl.
*B62K 25/28* (2006.01)
*B60G 15/14* (2006.01)
*B60G 17/052* (2006.01)
*F16F 9/38* (2006.01)
*F16F 9/43* (2006.01)
(Continued)

(52) U.S. Cl.
CPC ............ *B62K 25/283* (2013.01); *B60G 15/14* (2013.01); *B60G 17/0528* (2013.01); *B62K 25/10* (2013.01); *F16F 9/0472* (2013.01); *F16F 9/38* (2013.01); *F16F 9/43* (2013.01); *F16F 13/002* (2013.01); *B60G 2202/314* (2013.01);
(Continued)

(58) Field of Classification Search
CPC ..... B62K 25/283; B62K 25/10; F16F 13/002; F16F 9/43; F16F 9/0472; F16F 9/38; B60G 15/14; B60G 17/0528; B60G 2300/12; B60G 2202/314; B60G 2206/41; B60G 2206/424

USPC ... 267/64.23, 64.21, 64.19, 64.27, 281, 220; 188/322.13, 314
See application file for complete search history.

(56) References Cited

U.S. PATENT DOCUMENTS 2,698,068 A * 12/1954 Hein ....................... F16F 9/512
188/129
2,737,384 A * 3/1956 Laugaudin ............ F16F 9/0218
188/317
(Continued)

FOREIGN PATENT DOCUMENTS

DE 2538805 A 3/1976
DE 102009036554 A 7/2010
JP 2014-126079 A 7/2014

OTHER PUBLICATIONS

Extended European Search Report dated Aug. 5, 2016 for the corresponding European Patent Application No. 16152863.3.

*Primary Examiner* — Thomas J Williams
(74) *Attorney, Agent, or Firm* — Leason Ellis LLP

(57) ABSTRACT

An air suspension in an embodiment includes: a cylinder; a piston rod; a rod-side member disposed on the lower end side of the piston rod; a diaphragm; an axle-side attachment member having an upper end side of which is fixed to an opening at a lower end of the rod-side member, the axle-side attachment member including a fixing section for fixing the piston rod and an attachment hole joined to an axle; a gas passage formed in the axle-side attachment member, one end of the gas passage being opened to an upper end face of the axle-side attachment member and the other end of the gas passage being opened to a side section of the axle-side attachment member; and a valve section provided at the opening of the other end of the gas passage.

18 Claims, 3 Drawing Sheets

(51) Int. Cl.
*F16F 9/04* (2006.01)
*B62K 25/10* (2006.01)
*F16F 13/00* (2006.01)

(52) U.S. Cl.
CPC .... *B60G 2206/41* (2013.01); *B60G 2206/424* (2013.01); *B60G 2300/12* (2013.01)

(56) References Cited

U.S. PATENT DOCUMENTS

| | | | |
|---|---|---|---|
| 3,399,882 A | 9/1968 | Hausmann | |
| 4,022,448 A * | 5/1977 | Reeder | F16F 9/084 188/269 |
| 4,132,395 A * | 1/1979 | Fox, Jr. | F16F 9/088 137/539 |
| 4,257,580 A * | 3/1981 | Schnitzius | F16F 9/0218 188/322.13 |
| 6,135,434 A * | 10/2000 | Marking | F16F 9/36 188/315 |
| 8,813,925 B2 * | 8/2014 | Axelsson | F16F 9/063 188/269 |
| 9,186,950 B2 * | 11/2015 | Wootten | B60G 15/12 |
| 2003/0047398 A1 | 3/2003 | Toiyama | |
| 2010/0044937 A1 | 2/2010 | Lee et al. | |
| 2014/0175716 A1 * | 6/2014 | Sugata | B60G 15/12 267/64.24 |

* cited by examiner

AIR SUSPENSION

CROSS-REFERENCE TO RELATED APPLICATIONS

This application is based on and claims priority under 35 USC 119 from Japanese Patent Application No. 2015-065183 filed on Mar. 26, 2015, the entire disclosure of which is incorporated herein by reference.

BACKGROUND

1. Field of the Invention

An embodiment of the present invention relates to an air suspension.

2. Related Art

A motorcycle is provided with a suspension for, for example, comfort riding. As the suspension of the motorcycle, there is an air suspension having an air spring structure including a damper main body, which includes, for example, a cylinder in which a piston slides, and a diaphragm structure, which includes a diaphragm in which air is filled.

As the air suspension, for example, there is an air suspension of a so-called upright type in which a piston rod is present on a vehicle body side and a cylinder of a damper main body is present on an axle side. In the air suspension of the upright type, since the diaphragm structure is located on the vehicle body side, a valve section for filling the air in the diaphragm is provided in an upper part of the diaphragm structure.

In recent years, for example, an air suspension of a so-called inverted type is often used in which a cylinder of a damper main body is present on a vehicle body side and a piston rod is present on an axle side. In the air suspension of the inverted type, since the diaphragm structure is located on the axle side, a valve section for filling the air in the diaphragm is provided in a lower part of the diaphragm structure.

SUMMARY OF INVENTION

It is an object of at least one embodiment of the present invention to provide an air suspension that is excellent in operability and in which gas can be easily filled even when the air suspension includes a valve section for filling gas on an axle side. An air suspension in the at least one embodiment includes: a cylinder including, on an upper end side thereof, a vehicle-body-side attachment member joined to a vehicle body; a piston rod including a piston on an upper end side thereof and inserted into the cylinder together with the piston; a cylindrical rod-side member disposed on a lower end side of the piston rod and opened at an upper end of the rod-side member and a lower end thereof; a diaphragm having an upper end of which is fixed to a side of the cylinder and a lower end of which is fixed to the rod-side member, the diaphragm forming an air chamber around the piston rod; an axle-side attachment member having an upper end side of which is fixed to the opening at the lower end of the rod-side member, the axle-side attachment member which includes, on an upper end face thereof, a fixing section fixing a lower end of the piston rod and, on a lower end side thereof, an attachment hole joined to an axle; a gas passage formed in the axle-side attachment member, one end of the gas passage being opened to the upper end face of the axle-side attachment member and the other end of the gas passage being opened to a side section of the axle-side attachment member; and a valve section provided at the opening of the other end of the gas passage.

With the air suspension discussed above, even when the valve section for filling gas is provided on the axle side, the air suspension is excellent in operability. The gas can be easily filled in the air suspension.

DESCRIPTION OF EMBODIMENTS

An exemplary embodiment of the present invention is explained below with reference to the drawings.

Figure 1:
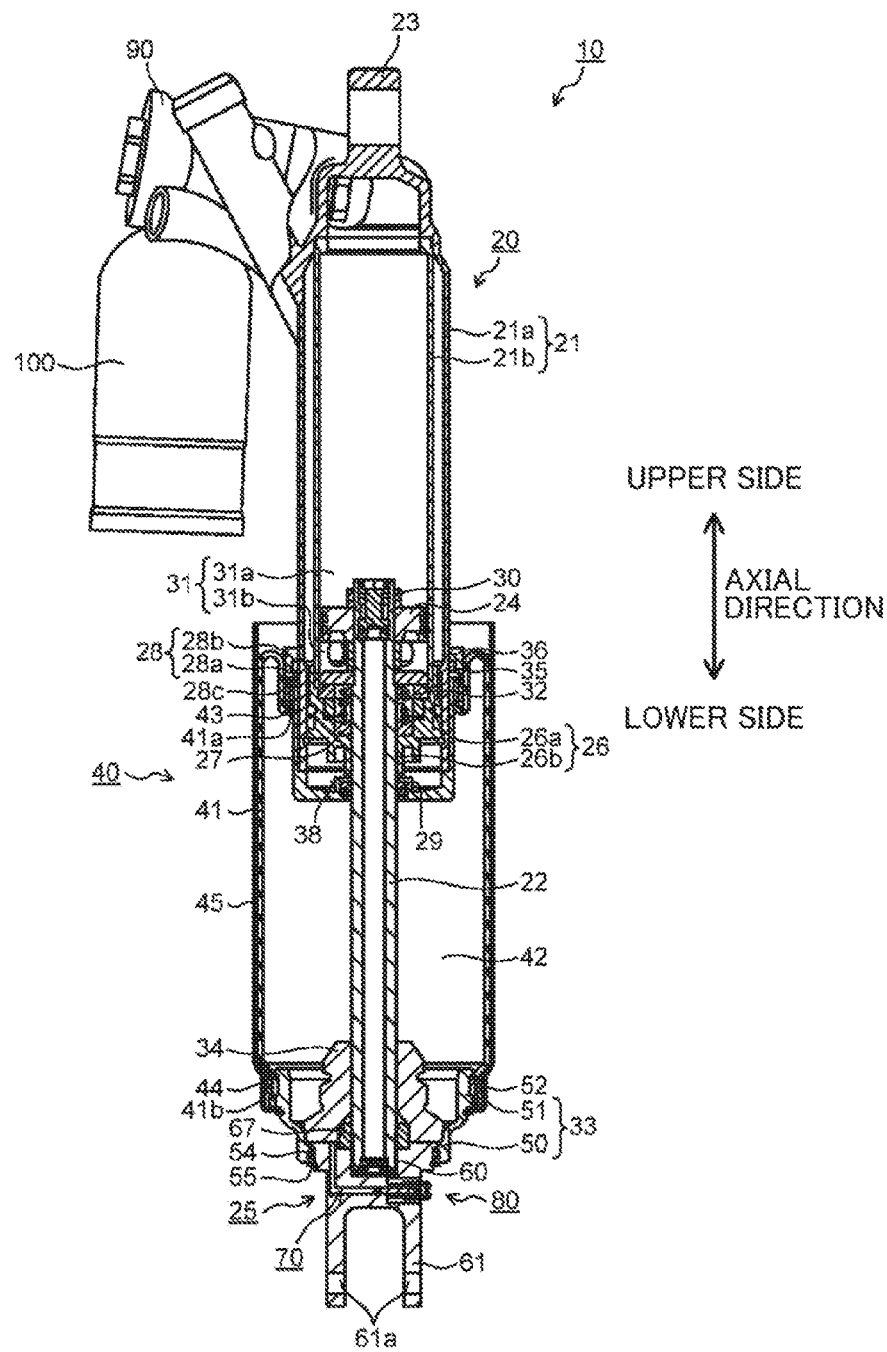
FIG. 1 is a diagram showing a longitudinal section of a suspension in an embodiment.
Figure 2:
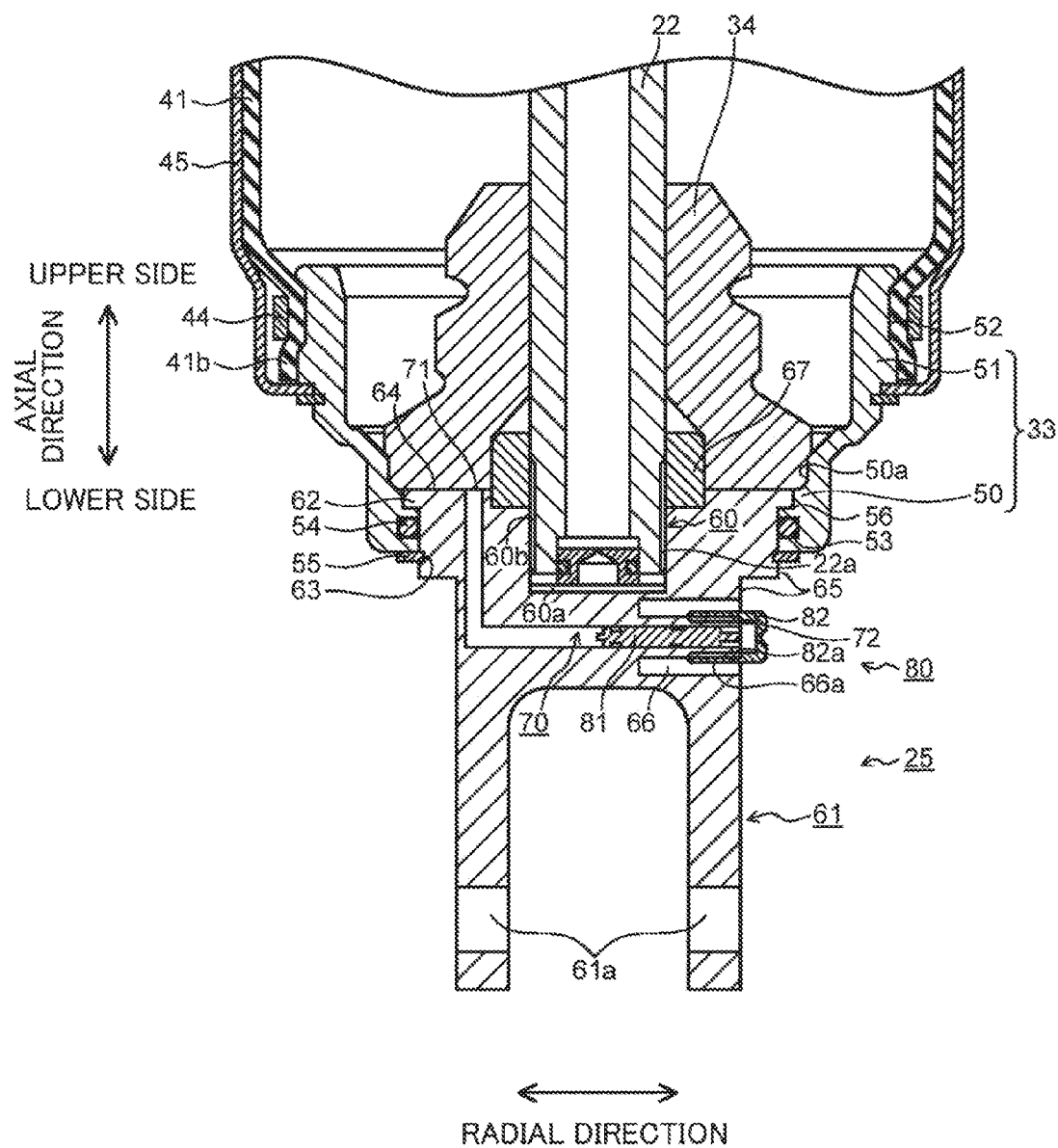
FIG. 2 is a diagram showing an enlarged longitudinal section on a lower side of the suspension in the embodiment.

FIG. 1 is a diagram showing a longitudinal section of an air suspension 10 in the embodiment. FIG. 2 is a diagram showing an enlarged longitudinal section on a lower side of the air suspension 10 in the embodiment. Note that, in FIG. 1, a most expanded state of the air suspension 10 is shown.

The air suspension 10 includes, as shown in FIG. 1, a damper main body 20 and a diaphragm structure 40. The air suspension 10 is a so-called damper with an air spring.

The damper main body 20 includes, for example, a cylinder 21, a piston rod 22, a vehicle-body-side attachment member 23, a rod guide 26, an end member 28, a rod-side member 33, an axle-side attachment member 25, a damping-force generating device 90 and a reservoir 100.

For example, the cylinder 21 includes, on an upper end side (an upper side in an axial direction) of the cylinder 21, the vehicle-body-side attachment member 23 joined to a vehicle body and, on a lower end side (a lower side in the axial direction) of the cylinder 21, an opening. Note that the axial direction refers to the direction of the center axes of cylinder 21 and the piston rod 22 coaxial with each other (the same applies below). The cylinder 21 is configured by, for example, a double tube including an outer cylinder 21a and an inner cylinder 21b.

An upper end portion of the outer cylinder 21a is closed and integrally formed with, for example, the vehicle-body-side attachment member 23. An upper end portion of the inner cylinder 21b is set in contact with, for example, an upper end inner surface of the outer cylinder 21a. Lower end portions of the outer cylinder 21a and the inner cylinder 21b are opened. The rod guide 26, through which piston rod 22 pierces, is fixed to the opening of the outer cylinder 21a.

The piston rod 22 includes a piston 24 on an upper end side of the piston rod 22 and on a lower end side that projects from the cylinder 21 to the outer side, the axle-side attachment member 25 joined to the axle. The piston rod 22 is inserted into the inner cylinder 21b together with the piston 24 that slides in the inner cylinder 21b of the cylinder 21.

For example, the vehicle-body-side attachment member 23 is coupled to a vehicle body side of a vehicle and the axle-side attachment member 25 is coupled to an axle side of the vehicle. Then, the air suspension 10 is interposed, for example, between the vehicle body and a swing arm attached to a wheel. The damper main body 20 exerts a damping force according to relative movements in the axial direction, that is, compression and extension of the cylinder 21 and the piston rod 22 to suppress vehicle body vibration.

Note that the configuration of the axle-side attachment member 25 is explained below in detail.

The rod guide 26 is liquid-tightly fixed to, for example, a lower end inner circumference of the outer cylinder 21a. The lower end portion of the inner cylinder 21b is set in contact with a step section in an upper end inner circumference of the rod guide 26.

For example, an upper part of the rod guide 26 is formed by a large-diameter cylinder section 26a and a lower part of the rod guide 26 is formed by a small-diameter cylinder section 26b. Note that a center axis of the large-diameter cylinder section 26a and a center axis of the small-diameter cylinder section 26b are coaxial. An oil seal 27 is provided in the an inner diameter portion of the small-diameter cylinder section 26b of the rod guide 26 to allow the piston rod 22 to liquid-tightly slide.

The bottomed cylindrical end member 28 opened at an upper end thereof and including a bottom at a lower end thereof is provided in the outer circumference of the lower part of the outer cylinder 21a. The end member 28 is configured to have a large outer diameter on an opening side (the upper end side). That is, the end member 28 includes a small-diameter cylinder section 28a and a large-diameter cylinder section 28b having the same inner diameter. Therefore, a step section 28c is formed on a radial direction outer side in a boundary between the small-diameter cylinder section 28a and the large-diameter cylinder section 28b. Note that a center axis of the small-diameter cylinder section 28a and a center axis of the large-diameter cylinder section 28b are coaxial.

The end member 28 is air-tightly fixed to the outer circumference of the outer cylinder 21a by an air seal 35 provided in an inner diameter portion of the large-diameter cylinder section 28b. An opening, through which the piston rod 22 pierces, is provided in the bottom of the small-diameter cylinder section 28a. An air seal 29 is provided in an inner diameter portion of the opening to allow the piston rod 22 to air-tightly slide. The lower end portion of the outer cylinder 21a is set in contact with, for example, a lower end inner surface of the end member 28. In the end member 28, a space 38 is formed between the end member 28 and the rod guide 26.

An oil chamber 31 of the cylinder 21 is fixed to the upper end side of the piston rod 22 by a nut 30 and divided into a piston-side oil chamber 31a and a rod-side oil chamber 31b by the piston 24 slidably inserted into an inner circumference of the inner cylinder 21b. A rebound spring 32 for regulating an extension side stroke is provided around the piston rod 22 and between the piston 24 and the rod guide 26.

The rod-side member 33 is a cylindrical body opened at an upper end thereof and a lower end thereof. For example, a lower part of the rod-side member 33 is formed by a small-diameter cylinder section 50 and an upper part of the rod-side member 33 is formed by a large-diameter cylinder section 51. Note that a center axis of the small-diameter cylinder section 50 and a center axis of the large-diameter cylinder section 51 are coaxial. The axle-side attachment member 25 is fixed to the opening at a lower end of the small-diameter cylinder section 50. Note that an example of the rod-side member 33 including the small-diameter cylinder section 50 and the large-diameter cylinder section 51 is explained. However, the rod-side member 33 is not limited to this shape. The rod-side member 33 may be a cylindrical body having a fixed outer diameter.

The axle-side attachment member 25 includes, for example, a fixing section 60 provided on an upper end face 64 and fixing the lower end of the piston rod 22 and an attachment member 61 provided on a lower side of the axle-side attachment member 25 and joined to the axle.

The fixing section 60 includes, as shown in FIG. 2, for example, a groove section 60a circular in an axial direction section and a screw section 60b formed on an inner side surface of the groove section 60a. A screw section 22a formed around a lower end portion of the piston rod 22 is screwed with the screw section 60b of the groove section 60a to fix the piston rod 22. Further, for example, a nut 67 is screwed in the screw section 22a of the piston rod 22 and tightened from the upper side to surely fix the piston rod 22 to the fixing section 60.

The attachment member 61 is configured by, for example, flat members opposed to each other. The axle-side attachment member 25 is fixed to the axle using an attachment hole 61a formed in the attachment member 61.

As shown in FIG. 2, for example, a flange section 62 projecting to the outer circumference side over the circumferential direction is formed at an upper end portion of the axle-side attachment member 25. The flange section 62 is fit in a step section 56 formed toward a radial direction outer side on an inner wall surface of the small-diameter cylinder section 50 in the rod-side member 33. The axle-side attachment member 25 extends toward the lower part via the opening at the lower end of the small-diameter cylinder section 50.

A groove section 53 is formed in the circumferential direction on the inner wall surface of the small-diameter cylinder section 50 further on a lower side than the step section 56. An air seal 54 is provided in the groove section 53. By providing the air seal 54, the inner wall of the small-diameter cylinder section 50 and a side section 65 of the axle-side attachment member 25 are air-tightly sealed.

In the side section 65 of the axle-side attachment member 25 further on a lower side than the flange section 62, as shown in FIG. 2, for example, a groove section 63 for fitting an inner circumference side of a stopper ring 55 is formed in the circumferential direction. Note that the groove section 63 is formed slightly further on the lower side than the lower end of the small-diameter cylinder section 50. The stopper ring 55 is fit in the groove section 63, whereby movement to an upper side of the axle-side attachment member 25 is suppressed. Note that the stopper ring 55 is configured by, for example, an annular flat plate having predetermined width. Note that, in the axle-side attachment member 25, at least a portion including the side section 65 where the groove section 63 is formed has a columnar shape.

As shown in FIG. 2, in the axle-side attachment member 25, a gas passage 70 having, at one end, an opening 71 in the upper end face 64 of the axle-side attachment member 25 and having, at the other end, an opening 72 in the side section 65 of the axle-side attachment member 25 is formed. That is, the gas passage 70 is configured by a through-hole. The other end of the gas passage 70 is opened to, for example, the side section 65 of the axle-side attachment member 25 between the fixing section 60 and the attachment hole 61a of the attachment member 61. In this way, the gas passage 70 is configured by, for example, an L-shaped through-hole including a bent section. Note that, for example, the side section 65 of the axle-side attachment member 25 including the opening 72 at the other end of the gas passage 70 may be recessed to an inner side thereof. The opening 72 may be provided in a position further recessed than the side section 65.

In the L-shaped gas passage 70, the gas passage 70 in a direction perpendicular to the axial direction is provided, for example, from one side (further on a left side than the center axis in FIG. 2) to the other side (further on a right side than the center axis in FIG. 2) through the center.

A valve section 80 is provided in the opening 72 at the other end of the gas passage 70. For example, the valve section 80 is used to fill gas on the inside of the diaphragm structure 40 and prevents the filled gas from flowing out to the outside from the opening 72. The valve section 80 is configured toward the direction perpendicular to the axial direction. The valve section 80 includes a valve main body 81 and a valve cap 82.

The valve main body 81 guides gas supplied from the outside to the gas passage 70. A part of the valve main body 81 is inserted into an inside of the gas passage 70 from the opening 72. An annular groove section 66 is formed in the side section 65 of the gas passage 70, which includes the opening 72, to surround the gas passage 70. On an inner circumferential surface of the groove section 66, for example, a screw section 66a screwed with a screw section 82a formed on an inner circumferential surface of the valve cap 82 is formed. The valve cap 82 is detachably attached to the screw section 66a of the groove section 66. Note that the valve main body 81 is sealed by tightening the valve cap 82.

For example, a distal end portion on a side of the opening 72 of the valve main body 81 is configured such that, for example, a pipe or the like for supplying gas can be coupled to the distal end portion. In the groove section 66, as shown in FIG. 2, when the valve cap 82 is attached, at least a part of the valve cap 82 is inserted into the groove section 66.

By providing the groove section 66 in this way, it is possible to reduce a range of the valve cap 82 projecting to the outside from the side section 65. By recessing the opening 72 at the other end of the gas passage 70 to the inner side as explained above, it is also possible to reduce a range of the valve cap 82 projecting to the outside from the side section 65.

As explained above, in the L-shaped gas passage 70, the gas passage 70 in the direction perpendicular to the axial direction is provided from one side (further on the left side than the center axis in FIG. 2) to the other side (further on the right side than the center axis in FIG. 2) through the center. Consequently, it is possible to secure the gas passage 70 long in the direction perpendicular to the axial direction. Therefore, for example, it is possible to insert most of the valve main body 81 into the inside of the gas passage 70. Therefore, it is possible to reduce a length of the valve main body 81 projecting to the outside from the opening 72.

A cylindrical stopper member 34 that regulates a compression side stroke is provided in the rod-side member 33 and around the piston rod 22. The lower end portion of the stopper member 34 is fit in, for example, an annular recess 50a formed in the small-diameter cylinder section 50 of the rod-side member 33. The stopper member 34 is formed of, for example, urethane or foamed urethane. Therefore, as shown in FIG. 2, even if the opening 71 of the gas passage 70 is covered by the stopper member 34, gas is introduced into an air chamber 42 in the diaphragm structure 40 through an air gap of the stopper member 34.

Note that, on a compression side stroke, for example, to prevent contact of the end member 28 and the rod-side member 33, the outer diameter of the small-diameter cylinder section 28a of the end member 28 is formed smaller than an inner diameter of the large-diameter cylinder section 51 of the rod-side member 33.

In an upper part of the outer cylinder 21a where the vehicle-body-side attachment member 23 is formed, the damping-force generating device 90 and the reservoir 100 communicating with the damping-force generating device 90 are provided side by side. The damping-force generating device 90 communicates with the piston-side oil chamber 31a and the rod-side oil chamber 31b in the cylinder 21. Therefore, the reservoir 100 communicates with the piston-side oil chamber 31a and the rod-side oil chamber 31b via the damping-force generating device 90. The damping-force generating device 90 adjusts a compression side damping force and an extension side damping force. The reservoir 100 compensates for a capacity of the piston rod 22 (including a capacity equivalent to temperature expansion of oil) that advances to and retracts from the oil chamber 31 of the cylinder 21.

The diaphragm structure 40 includes a cylindrical diaphragm 41. The diaphragm 41 is configured by an elastic member such as rubber. An upper end portion 41a of the diaphragm 41 is fixed to, for example, an outer circumferential surface of the small-diameter cylinder section 28a on the large-diameter cylinder section 28b side of the end member 28. That is, the upper end portion 41a of the diaphragm 41 is fixed to the outer circumferential surface of the small-diameter cylinder section 28a on the step section 28c side. Consequently, movement to the vehicle-body-side attachment member 23 side (the upward side in the axial direction) of this fixing position is prevented.

A lower end portion 41b of the diaphragm 41 is fixed to, for example, an outer circumferential surface of the large-diameter cylinder section 51 of the rod-side member 33. For example, a groove section 52 is formed in the circumferential direction on the outer circumferential surface of the large-diameter cylinder section 51 that fixes the lower end portion 41b of the diaphragm 41. A width of the groove section 52 is set according to a width of a caulking band 44 explained below. By providing the groove section 52, it is possible to easily perform positioning of the fixing position. Movement in the up-down direction (the axial direction) of the fixing position is prevented.

In the diaphragm structure 40, an attachment diameter of the large-diameter cylinder section 51 of the rod-side member 33, to which the lower end portion 41b of the diaphragm 41 is fixed, is set large compared with an attachment diameter of the small-diameter cylinder section 28a of the end member 28, to which the upper end portion 41a of the diaphragm 41 is fixed. Making use of a difference between the attachment diameters, an annular space is formed around the upper side (the upper side in the axial direction) of the end member 28 where the attachment diameter is small. The annular space has a shape formed when a reverse U-shaped space is rotated around the center axes of the cylinder 21 and the piston rod 22 in sectional view.

Note that the diaphragm 41 is fixed to the end member 28 and the rod-side member 33 by, for example, respectively winding metal caulking bands 43 and 44 from the outer circumferential side and caulking and fixing the caulking bands 43 and 44. Note that the caulking bands 43 and 44 may have, for example, a C ring shape or an annular shape.

By providing the diaphragm 41 in this way, the air chamber 42 is formed around the cylinder 21 (the end member 28) and the piston rod 22. Gas is filled in the air chamber 42. Note that the air chamber 42 is sealed such that the gas on the inside does not leak.

Examples of the filled gas include the air and nitrogen. Note that the gas is supplied from a pipe or the like of a gas supply source via the valve section 80 and the gas passage 70 and filled in the air chamber 42.

The diaphragm 41 rolls on an outer side surface of the large-diameter cylinder section 28b of the end member 28 and an outer side surface of the outer cylinder 21a of the cylinder 21 according to expansion and retraction of the damper main body 20. The air chamber 42, in which the air having predetermined pressure is filled, configures an air spring that elastically urges the damper main body 20 in an expanding direction. Therefore, a spring force is generated according to a capacity change of the air chamber 42 involved in the expansion and retraction of the damper main body 20.

The diaphragm structure 40 may include, as shown in FIG. 1, a cylindrical cover 45 that covers an outer circumference of the diaphragm 41. A lower end portion of the cover 45 is fixed to, for example, the large-diameter cylinder section 51 of the rod-side member 33. An upper end portion of the cover 45 is opened and extended until the upper end portion passes the end portion on the upper side of the diaphragm 41 in a state in which the air suspension 10 shown in FIG. 1 extends most.

The cover 45 is formed of, for example, a metal material or a resin material. By covering by the cover 45 the outer circumference of the diaphragm 41 in this way, it is possible to prevent damage, wear, and the like of the diaphragm 41 due to dust, stones, and the like.

Note that, in an example explained above, the damper main body 20 includes the cylinder 21, the piston rod 22, the vehicle-body-side attachment member 23, the rod guide 26, the end member 28, the rod-side member 33, the axle-side attachment member 25, the damping-force generating device 90, and the reservoir 100. However, the damper main body 20 is not limited to this configuration. For example, the diaphragm structure 40 may include a part of these components.

An action of the air suspension 10 in the embodiment is explained.

Figure 3:
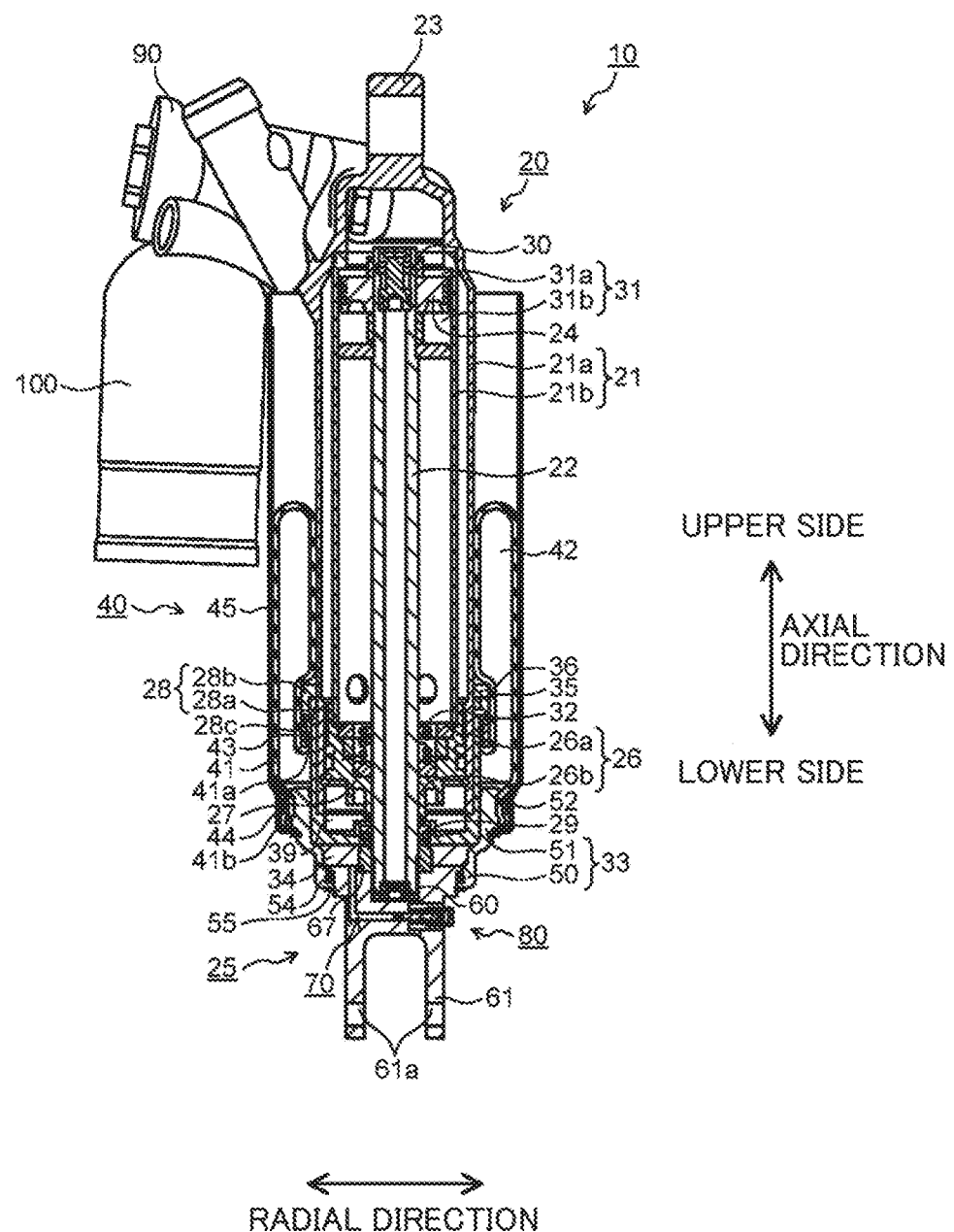
FIG. 3 is a diagram showing a longitudinal section of the suspension in the embodiment.

Note that the action of the diaphragm structure 40 is mainly explained. FIG. 3 is a diagram showing a longitudinal section of the air suspension 10 in the embodiment. Note that, in FIG. 3, a most retracted state of the air suspension 10 is shown.

First, in the air suspension 10, gas is filled in the air chamber 42 of the diaphragm 41 to adjust the inside of the air chamber 42 to predetermined pressure.

When the gas is filled in the air chamber 42, first, the valve cap 82 is detached. For example, a pipe for supplying the gas is coupled to the distal end portion of the valve main body 81 projecting to the outside from the opening 72 to supply the gas to the gas passage 70. The gas supplied to the gas passage 70 is introduced into the air chamber 42 from the opening 71 of the gas passage 70.

The gas introduced into the air chamber 42 spreads in the air chamber 42 through the air gap of the stopper member 34. The gas is supplied until the inside of the air chamber 42 reaches predetermined pressure. After the inside of the air chamber 42 reaches the predetermined pressure, the valve cap 82 is attached. Note that, when the gas is introduced into the air chamber 42, for example, the pressure in the air chamber 42 is measured with a pressure gauge or the like. In this way, the inside of the air chamber 42 is adjusted to the predetermined pressure.

A compression side stroke and an extension side stroke in the air suspension 10 in which the inside of the air chamber 42 is adjusted to the predetermined pressure is explained.

In the compression side stroke, when the air suspension 10 (the damper main body 20) in FIG. 1 retracts from the most expanded state, as shown in FIG. 3, the diaphragm 41 rolls to the upper side along the outer side surface of the large-diameter cylinder section 28b of the end member 28 and the outer side surface of the outer cylinder 21a of the cylinder 21.

In this case, a capacity change of the air chamber 42 involved in the retraction of the damper main body 20 occurs. At the same time, a capacity change of the air chamber 42 due to the rolling of the diaphragm 41 along the outer side surfaces of the large-diameter cylinder section 28b and the outer cylinder 21a occurs. Reaction changes according to the capacity change.

In a most retracted state of the air suspension 10, as shown in FIG. 3, the air chamber 42 changes to an annular space formed among the outer cylinder 21a, the end member 28, and the cover 45.

On the other hand, when the air suspension 10 expands from the most retracted state, the diaphragm 41 also rolls to the lower side along the outer side surface of the outer cylinder 21a and the outer side surface of the large-diameter cylinder section 28b. In this case, in the air chamber 42, a capacity change same as the capacity change explained above occurs. The air suspension 10 changes to the most expanded state (see FIG. 1).

Note that, for example, the air suspension 10 mounted on the vehicle irregularly repeats expansion and retraction. Therefore, it is less likely that the air suspension 10 continuously changes from the most expanded state to the most retracted state. However, the air suspension 10 mounted on the vehicle is also in the most expanded state or the most retracted state.

With the air suspension 10 in the embodiment, the valve section 80 for supplying gas into the air chamber 42 is configured on the side section 65 of the axle-side attachment member 25 toward the direction perpendicular to the axial direction. Therefore, it is possible to easily check the distal end portion of the valve main body 81. It is possible to easily perform gas filling work. This makes it easy to adjust a reaction characteristic in the air suspension 10.

In the air suspension 10, by providing the groove section 66, it is possible to reduce the range of the valve cap 82 projecting to the outside from the side section 65.

Further, in the air suspension 10, by providing the gas passage 70 in the direction perpendicular to the axial direction in the L-shaped gas passage 70 from one side (further on the left side than the center axis in FIG. 2) to the other side (further on the right side than the center axis in FIG. 2) through the center, it is possible to insert most of the valve main body 81 into the inside of the gas passage 70. Therefore, it is possible to reduce the length of the valve main body 81 projecting to the outside from the opening 72.

The air suspension 10 in this embodiment can be applied to, for example, a rear suspension (a rear cushion) of a motorcycle. In the example explained in the embodiment, the damping-force generating device 90 and the reservoir 100 are provided on the outside of the damper main body 20. However, the air suspension 10 is not limited to this configuration. This embodiment can also be applied to, for example, a suspension provided on the inside of a damper main body.

The several embodiments of the present invention are explained above. However, these embodiments are presented as examples and are not intended to limit the scope of the invention. These new embodiments can be implemented in other various forms. Various omissions, substitutions, and changes can be made without departing from the spirit of the invention. These embodiments and modifications are included in the scope and the gist of the invention and included in the inventions described in claims and a scope of equivalents of the inventions.

What is claimed is:

1. An air suspension comprising:
a cylinder including, on an upper end side thereof, a vehicle-body-side attachment member joined to a vehicle body;
a piston rod including a piston on an upper end side thereof and inserted into the cylinder together with the piston;
a cylindrical rod-side member disposed on a lower end side of the piston rod and opened at an upper end of the rod-side member and a lower end thereof;
a diaphragm having an upper end of which is fixed to a side of the cylinder and a lower end of which is fixed to the rod-side member, the diaphragm forming an air chamber around the piston rod;
an axle-side attachment member having an upper end side of which is fixed to the opening at the lower end of the rod-side member, the axle-side attachment member which includes, on an upper end face thereof, a fixing section fixing a lower end of the piston rod and, on a lower end side thereof, an attachment hole joined to an axle;
a gas passage formed in the axle-side attachment member extending across an axis of the piston rod, one end of the gas passage being opened to the upper end face of the axle-side attachment member and the other end of the gas passage being opened to a side section of the axle-side attachment member;
a valve section provided at the opening of the other end of the gas passage; and
an annular groove that is provided at the side section of the axle-side attachment member so as to surround the gas passage and has a screw section formed on an outer periphery of the annular groove, wherein
the valve section includes:
a valve main body that is inserted into the gas passage and guides gas supplied from an outside to the gas passage; and
a valve cap that has a screw section on an inner periphery thereof that mates with the screw section of the annular groove so as to seal the valve main body.

2. The air suspension according to claim 1, wherein the other end of the gas passage is opened to the side section of the axle-side attachment member between the fixing section and the attachment hole.

3. The air suspension according to claim 2, wherein the gas passage is formed by an L-shaped through-hole including a bent section.

4. The air suspension according to claim 3, wherein the valve cap is attached in a state where at least a part of the valve cap is inserted into the annular groove.

5. The air suspension according to claim 4, further comprising:
a cylindrical cover having a lower end of which is fixed to the rod-side member and an upper end of which is opened, the cylindrical cover covering an outer circumference of the diaphragm.

6. The air suspension according to claim 3, further comprising:
a cylindrical cover having a lower end of which is fixed to the rod-side member and an upper end of which is opened, the cylindrical cover covering an outer circumference of the diaphragm.

7. The air suspension according to claim 2, wherein the valve cap is attached in a state where at least a part of the valve cap is inserted into the annular groove.

8. The air suspension according to claim 7, further comprising:
a cylindrical cover having a lower end of which is fixed to the rod-side member and an upper end of which is opened, the cylindrical cover covering an outer circumference of the diaphragm.

9. The air suspension according to claim 2, further comprising:
a cylindrical cover having a lower end of which is fixed to the rod-side member and an upper end of which is opened, the cylindrical cover covering an outer circumference of the diaphragm.

10. The air suspension according to claim 1, wherein the gas passage is formed by an L-shaped through-hole including a bent section.

11. The air suspension according to claim 10, wherein the valve cap is attached in a state where at least a part of the valve cap is inserted into the annular groove.

12. The air suspension according to claim 11, further comprising:
a cylindrical cover having a lower end of which is fixed to the rod-side member and an upper end of which is opened, the cylindrical cover covering an outer circumference of the diaphragm.

13. The air suspension according to claim 10, further comprising:
a cylindrical cover having a lower end of which is fixed to the rod-side member and an upper end of which is opened, the cylindrical cover covering an outer circumference of the diaphragm.

14. The air suspension according to claim 1, wherein the valve cap is attached in a state where at least a part of the valve cap is inserted into the annular groove.

15. The air suspension according to claim 14, further comprising:
a cylindrical cover having a lower end of which is fixed to the rod-side member and an upper end of which is opened, the cylindrical cover covering an outer circumference of the diaphragm.

16. The air suspension according to claim 1, further comprising:
a cylindrical cover having a lower end of which is fixed to the rod-side member and an upper end of which is opened, the cylindrical cover covering an outer circumference of the diaphragm.

17. The air suspension according to claim 1, wherein the gas passage has a vertical portion extending in an axial direction of the piston rod and a horizontal portion extending in a direction perpendicular to the axial direction,
the vertical portion is longer than the fixing section in the axial direction.

18. The air suspension according to claim 17, wherein the vertical portion extends parallel to the piston rod in the axial direction.

* * * * *